United States Patent [19]

Bogiel

[11] Patent Number: 5,203,711
[45] Date of Patent: Apr. 20, 1993

[54] MODULAR INTERCHANGEABLE POWER DISTRIBUTION SYSTEM

[75] Inventor: Steven B. Bogiel, Schaumburg, Ill.

[73] Assignee: Molex Incorporated, Lisle, Ill.

[21] Appl. No.: 899,195

[22] Filed: Jun. 16, 1992

Related U.S. Application Data

[63] Continuation of Ser. No. 771,029, Oct. 1, 1991, Pat. No. 5,131,860.

[51] Int. Cl.$^5$ ............................................. H01R 13/74
[52] U.S. Cl. .................................... 439/215; 439/211; 439/545; 174/57
[58] Field of Search ............... 439/207, 211, 215, 532, 439/545, 212, 114; 174/48, 57

[56] References Cited

U.S. PATENT DOCUMENTS

| | | | |
|---|---|---|---|
| 3,355,702 | 11/1967 | Mundschenk et al. | 439/545 |
| 3,850,497 | 11/1974 | Krumreich et al. | 439/545 |
| 4,017,137 | 4/1977 | Parks | 174/48 |
| 4,323,723 | 4/1982 | Fork et al. | 174/48 |
| 5,127,852 | 7/1992 | Cravens et al. | 439/545 |

*Primary Examiner*—Gary F. Paumen
*Attorney, Agent, or Firm*—Stephen Z. Weiss

[57] ABSTRACT

A power distribution system is disclosed for electrification of modular wall panels. The distribution system includes a track along a wall panel, a plurality of electrical power lines running along the track and defining a plurality of power distribution circuits, and a plug-receiving receptacle mounted adjacent the power lines for interconnection therewith. The invention contemplates receptacle contacts mounted on the receptacle, a plurality of circuit contacts interconnected with the power lines, and a plurality of interchangeable circuit control modules for selectively interchangeably interconnecting the plug-receiving receptacle with different power distribution circuits. The interchangeable circuit control modules include a plurality of control contacts of different arrays engageable between the receptacle contacts and different ones of the circuit contacts.

6 Claims, 6 Drawing Sheets

MODULAR INTERCHANGEABLE POWER DISTRIBUTION SYSTEM

This is a continuation of copending application Ser. No. 07/771,029 filed on Oct. 1, 1991 now U.S. Pat. No. 5,131,860.

FIELD OF THE INVENTION

This invention generally relates to the art of power distribution systems and, particularly, to such systems for electrification of areas such as modular wall panels by means of interchangeable circuit control modules.

BACKGROUND OF THE INVENTION

There are various environments wherein a plurality of different power lines, including power circuits and ground circuits, lead from different power sources, which may include different transformers, fuses and the like, to a given area for distribution thereat. Most often, a plurality of electrical connectors are used for interconnection, respectively, with the different power lines. For instance, the connectors may be provided in the form of plug-receiving receptacles and each receptacle is interconnected to an individual power line.

An example of such an environment is in the art of modular wall panel systems which divide a given area into separate or distinct work areas. All kinds of electronic equipment, such as computers, printers, heaters and the like may be employed in each work area and must be "plugged-in" to the power distribution lines. The utilization of an electrical connector for each separate power distribution line results in very cumbersome outlet configurations involving a multiplicity of receptacles or outlets and an undesirable duplicity of many of the connector components. The need for a plurality of power lines can range from the obvious necessity of preventing overloading of a given line, to the need for providing an isolated or "clean" line having an isolated ground whereby sensitive equipment such as computers or delicate sensing devices are not exposed to current spikes or impulses caused by other electrical equipment, such as a heater, being interconnected to the same power line. An example of a problem which could occur when sharing such equipment is the accidental erasure of computer data, for instance.

There is a need for, and it would be highly desirable to provide a power distribution system for the electrification of a given area utilizing a plurality of power distribution lines, wherein a common receptacle can be used in conjunction with interchangeable circuit control modules for interchangeably interconnecting the common receptacle with any one of the different power lines. This invention is directed to satisfying this need and solving the problems identified above.

SUMMARY OF THE INVENTION

An object, therefore, of the invention is to provide an improved power distribution system including a new concept of utilizing interchangeable circuit control modules.

The invention is illustrated herein as embodied in a power distribution system for electrification of modular wall panels. The panels may include track means along a wall panel, a plurality of electrical power lines running along the track means and defining a plurality of power distribution circuits. A plug-receiving receptacle is mounted adjacent the power lines for interconnection therewith. Of course, it should be understood that the concepts of the invention are equally applicable and useful in other environments than modular wall panel systems.

In the exemplary embodiment of the invention, receptacle contact means are provided on the plug-receiving receptacle, a plurality of circuit contacts are interconnected with the power lines, and a plurality of interchangeable circuit control modules are provided for interchangeably interconnecting the plug-receiving receptacle with the different power distribution circuits. The interchangeable circuit control modules include a plurality of control contacts of different arrays engageable with the receptacle contact means and different ones of the circuit contacts.

In the preferred embodiment, a common housing means is provided for mounting the plug-receiving receptacle, the circuit contacts and the interchangeable circuit control modules. The common housing means has a first opening for receiving the plug-receiving receptacle and a second opening for interchangeably receiving the circuit control modules. The first and second openings are in communication, and the receptacle contact means and the control contacts have respectively complementarily engageable portions exposed on the receptacle and on the control modules, respectively, for interconnection between the communicating openings. The first and second openings open at a front of the common housing means, and the circuit contacts project from a rear of the common housing means for interconnection with the power lines.

In the exemplary embodiment of the invention, the circuit contacts have insulation displacement portions projecting from the rear of the common housing means. A strain relief means is mountable to the rear of the common housing means for holding the power lines in interconnection with the rearwardly projecting circuit contacts.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
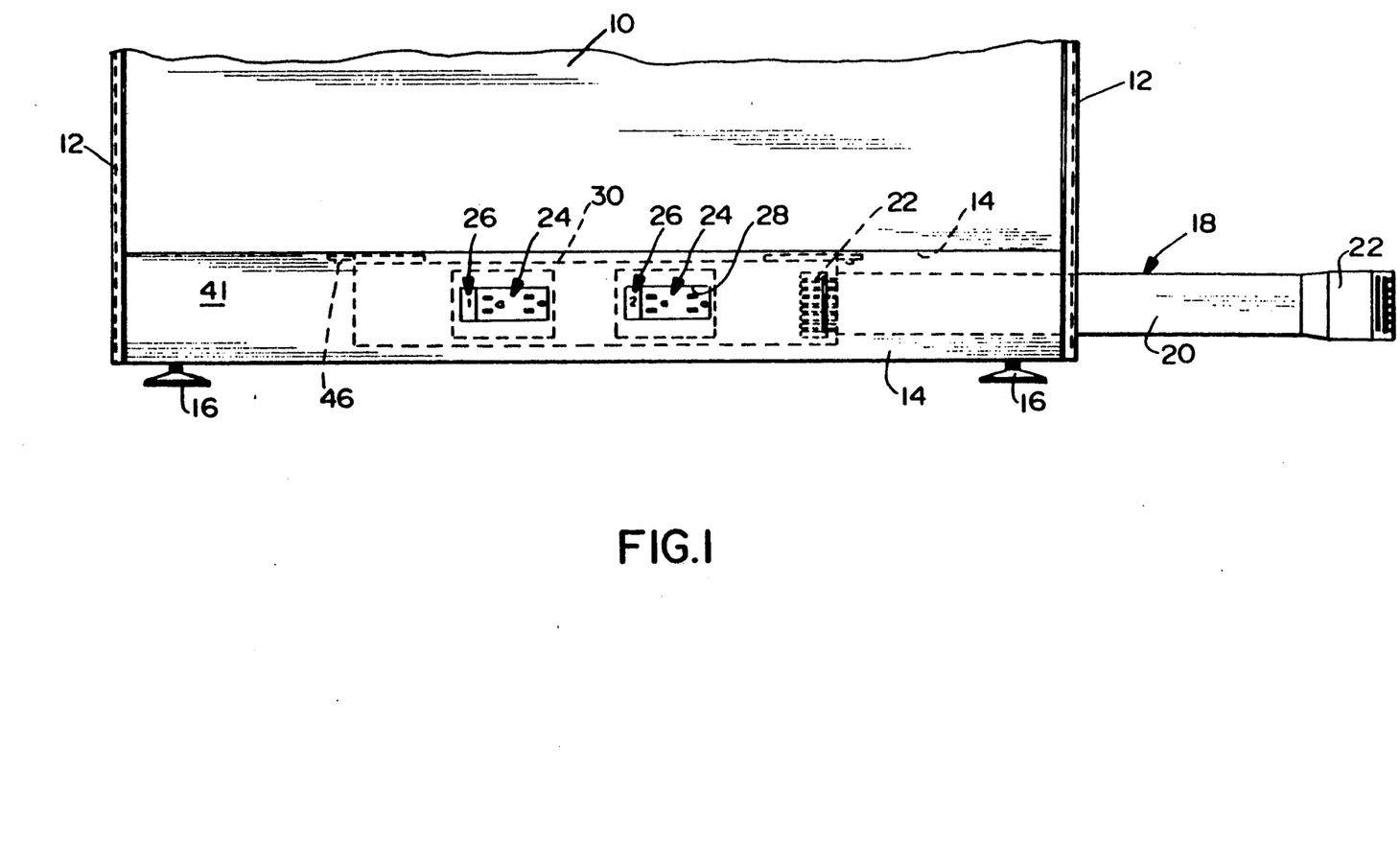
FIG. 1 is a fragmented elevational view of a modular wall panel embodying the concepts of the invention.

Referring to the drawings in greater detail, and first to FIG. 1, the invention is exemplified herein for use in a power distribution system for the electrification of modular wall panels, such as are used in dividing a given area into separate work spaces. As stated above, however, it should be understood that the invention is equally applicable and useful for other environments than modular wall panel systems.

More particularly, FIG. 1 shows a modular wall panel 10 having upright support members 12 along opposite vertical edges thereof, and a track means 14 running generally horizontally along the bottom of panel 10. As is known, the track means provide a generally hollow conduit or passage along the bottoms of the interconnected wall panels for receiving power distribution lines to feed power to the different work areas for utilization thereat. Panel 10, including upright supports 12 and track means 14, is supported on a subjacent surface, such as a floor or the like, by support feet 16.

FIG. 1 also shows a panel-to-panel "whip connector", generally designated 18, which comprises a harness having wiring 20 interconnected between power connectors 22 at opposite ends of the harness. The harness includes a plurality of power lines providing a plurality of distribution circuits between adjacent wall panels or between an end-most panel and a power source. As will be described in greater detail, FIG. 1 shows a pair of common receptacles, generally designated 24, and an accompanying pair of circuit selectors in the form of interchangeable circuit control modules, generally designated 26, exposed through an aperture 28 in track means 14. The receptacles and circuit control modules are part of a power distribution subassembly, generally designated 30, mounted within track means 14.

Figure 2:
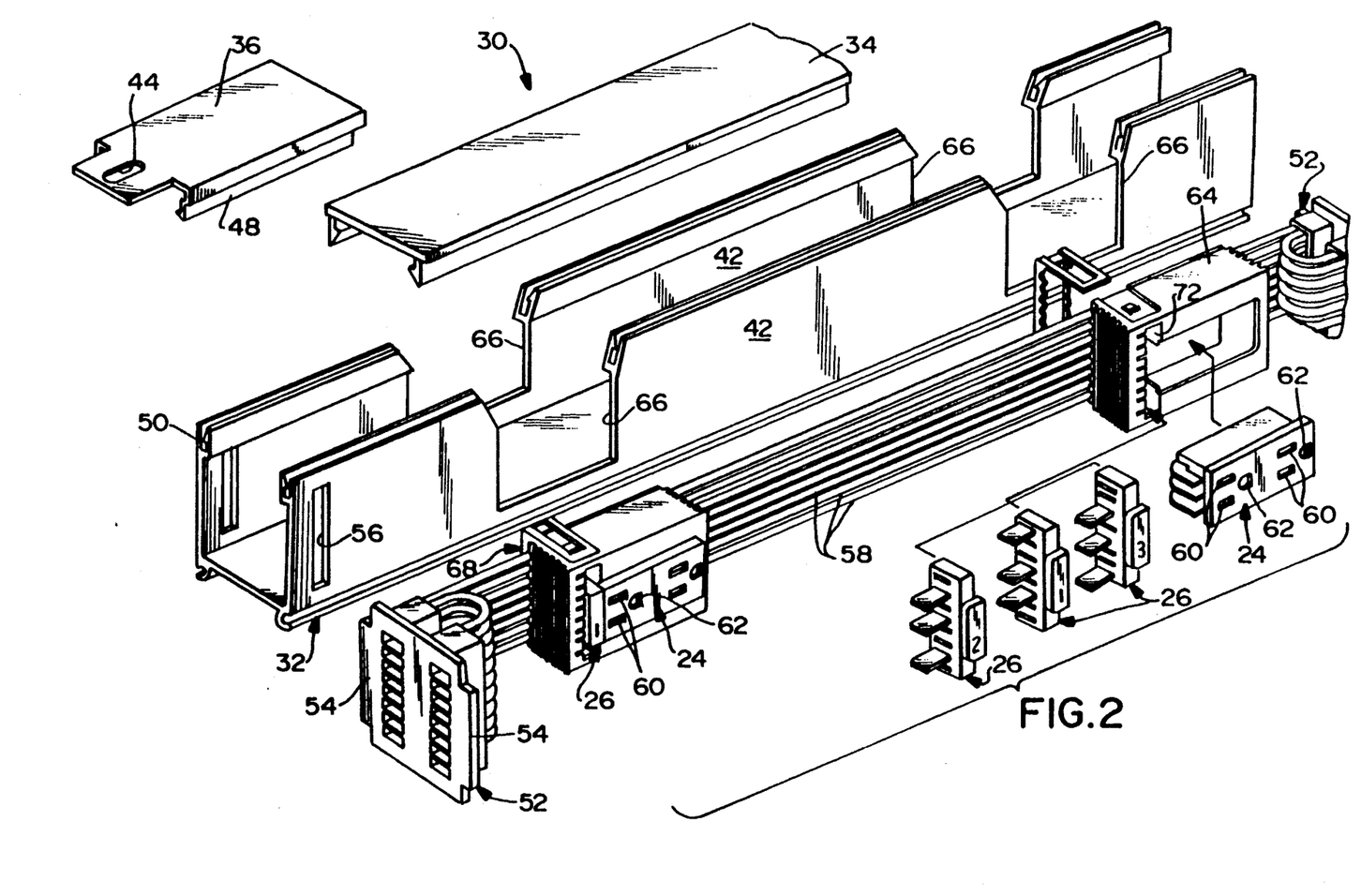
FIG. 2 is an exploded perspective view of the components mounted within the track means of the wall panel, including various components according to the invention.

FIG. 2 shows the various components of power distribution subassembly 30, including receptacles 24 and circuit control modules 26, according to the invention. The power distribution subassembly 30 includes a generally U-shaped channel, generally designated 32, along with a cover 34 and an end mounting bracket 36. Cover 34 has hooked flanges 38 running longitudinally along opposite sides thereof, and depending from the bottom thereof, for snapping into hooked grooves 40 along the top edges of side walls 42 of channel 32. End bracket 36 may be of various designs and will not be described in detail herein, the designs varying to fit different panel configurations and to mount the power distribution subassembly within track means 14 (FIG. 1). Suffice it to say, the mounting bracket includes apertures 44 (FIG. 2) for receiving appropriate fastening means 46 (FIG. 1) for mounting the power distribution subassembly within track means 14 on the underside of panel 10. The mounting bracket includes hooked flanges 48 for snapping into hooked grooves 50 along the top edge of U-shaped channel 32.

As stated above in relation to FIG. 1, power distribution harness 18 includes a plurality of power lines or wiring 20 defining power distribution circuits between adjacent wall panels or between a given wall panel, such as panel 10, and an appropriate power source. Power connectors 22 are provided at opposite ends of the harness. Now, referring to FIG. 2, power distribution subassembly 30 includes a pair of end connectors, generally designated 52, mounted within the ends of U-shaped channel 32 by means of flanges 54 projecting outwardly from the end connectors into slots 56 in the sides of the channel. A plurality of "power" lines 58 run between and are appropriately interconnected between contacts within end connectors 52. Therefore, with either one or both of the end connectors being coupled with a respective power connector 22 of a harness 18 (FIG. 1), power is distributed to power lines 58 within U-shaped channel 32.

At this point, it should be understood that the use of the term "power" lines 58 is meant to encompass wiring which may include separate "hot" or power wires, neutral wires and ground wires, as is well known.

Generally, the invention contemplates an interchangeable modular system whereby common receptacles 24 can be interconnected with different ones of power lines 58 running between end connectors 52. The use of the term "common" receptacle 24 is meant to mean any receptacle, including known or standard receptacle configurations adapted for receiving a standard electrical plug. For instance, each receptacle 24 shown in FIG. 2 includes the usual pair of prong receiving slots 60 along with a ground prong receiving hole 62.

Still referring to FIG. 2, each receptacle 24 and any one of a plurality of interchangeable circuit modules 26 are mounted into the front of a common housing 64 which is positioned within U-shaped channel 32, whereby the receptacle and the module project through an opening 66 in one side wall 42 of the channel. Openings 66 are shown in both opposite side walls of the channel because the modular wall panel may service two adjacent work areas on opposite sides of the wall panel. As described in relation to FIG. 1, the receptacles and the circuit control modules also are accessible through openings 28 in track means 14 along the bottom of the wall panel. As described in greater detail hereinafter, strain relief means, generally designated 68, are engageable with the back sides of housings 64 to hold power lines 58 in interengagement with a plurality of circuit contacts mounted within housing 64, as will be apparent hereinafter.

Figure 7:
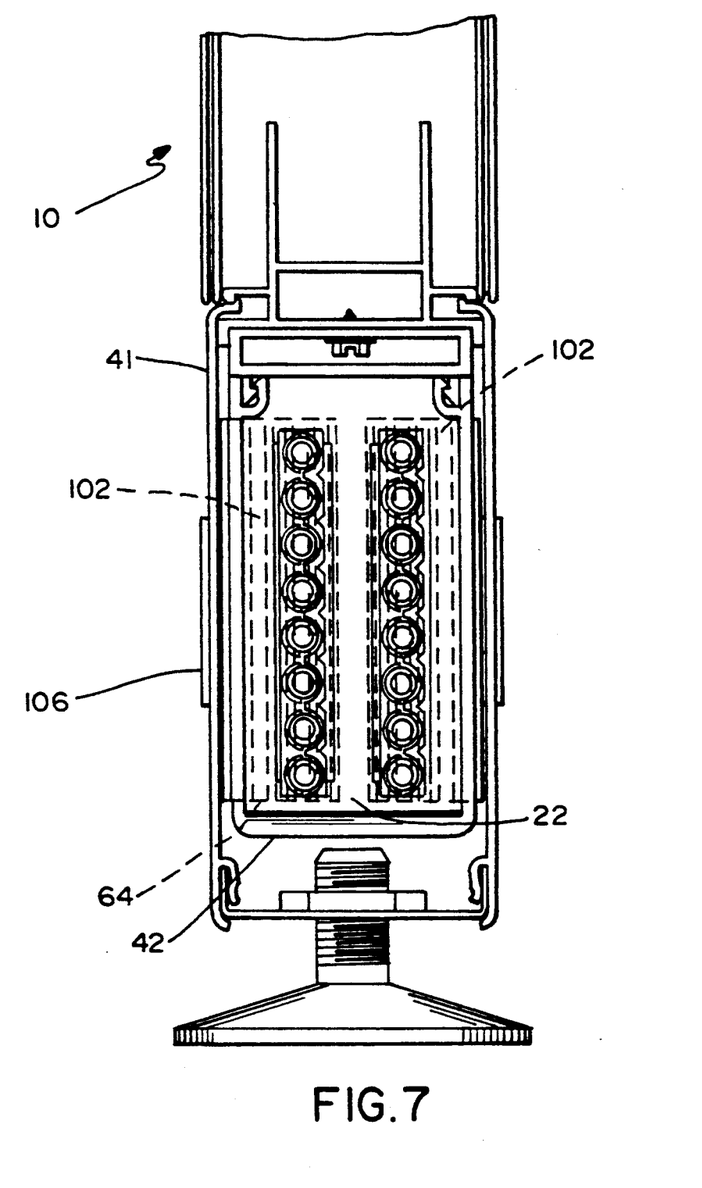
FIG. 7 is an end view of FIG. 1 showing the ability of the invention to fit within panels having a narrow thickness.
Figure 8:
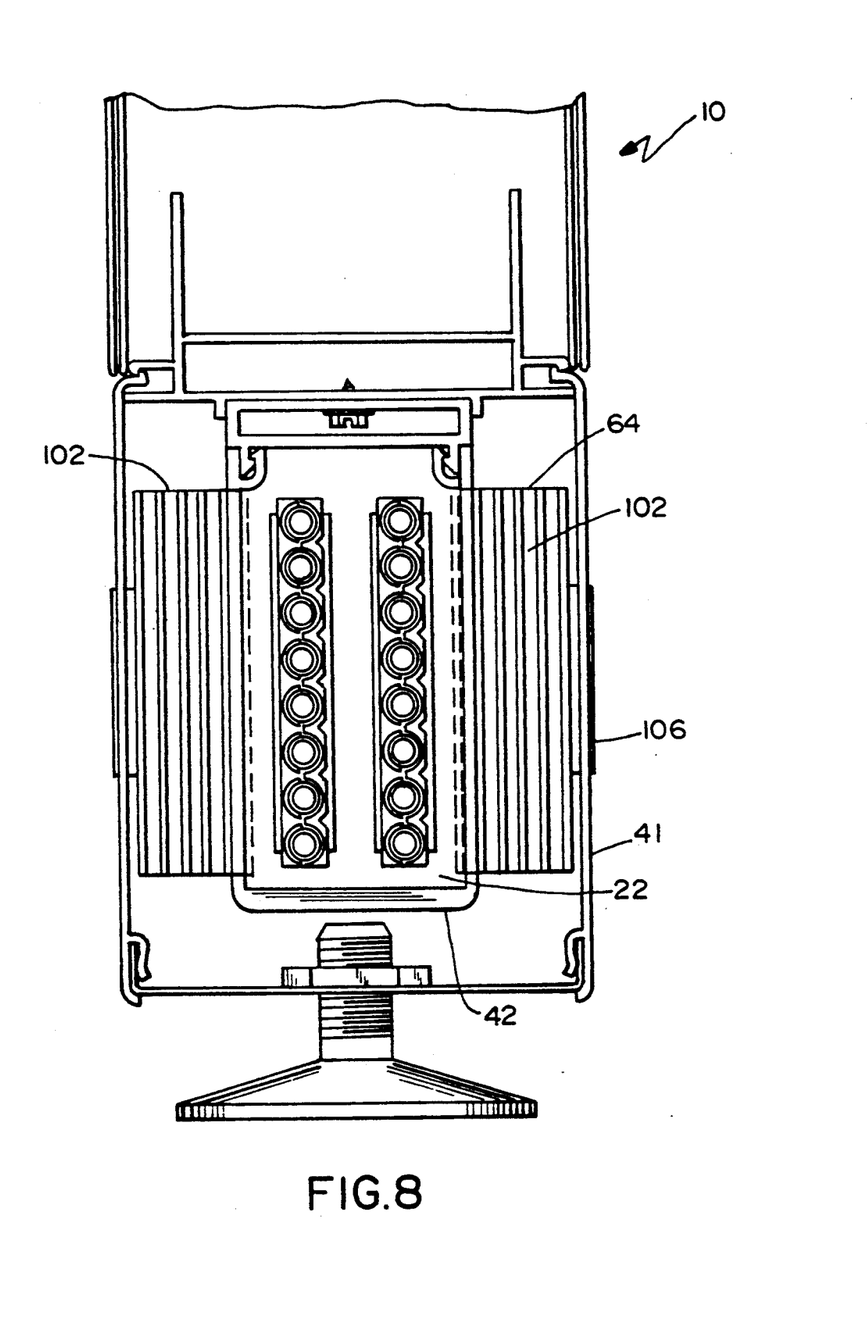
FIG. 8 is an end view of FIG. 1 showing the ability of the invention to fit within panels having a wide thickness.

FIGS. 2, 7 and 8, show the ability of the invention to adjust to panels having different thicknesses widths while using the same components of the power distribution subassembly 30. The common housing 64 has a multiple of vertically oriented slots 102 on two opposite sides of the housing. These slots are adapted to slide into vertical sides 104 of opening 66 in sidewall 42. Cut 100 is provided through hooked grooves 40 and 50 so that slots 102 can slip unto vertical sides 104 without interfering with the hooked grooves 40 and 50. The thickness of the wall panel will determine which of the slots 102 will be slipped over vertical side 104. FIG. 7 shows slots 102 closest to the outwardly facing receptacle surface 106 slipped over vertical sides 102. This arrangement is used for a wall panel having a relatively small thickness. FIG. 8 shows slots 102 furthest from the outwardly facing receptacle surface 106 slipped over the vertical sides 102. This arrangement is used for a wall panel having a relatively large thickness.

Figure 3:
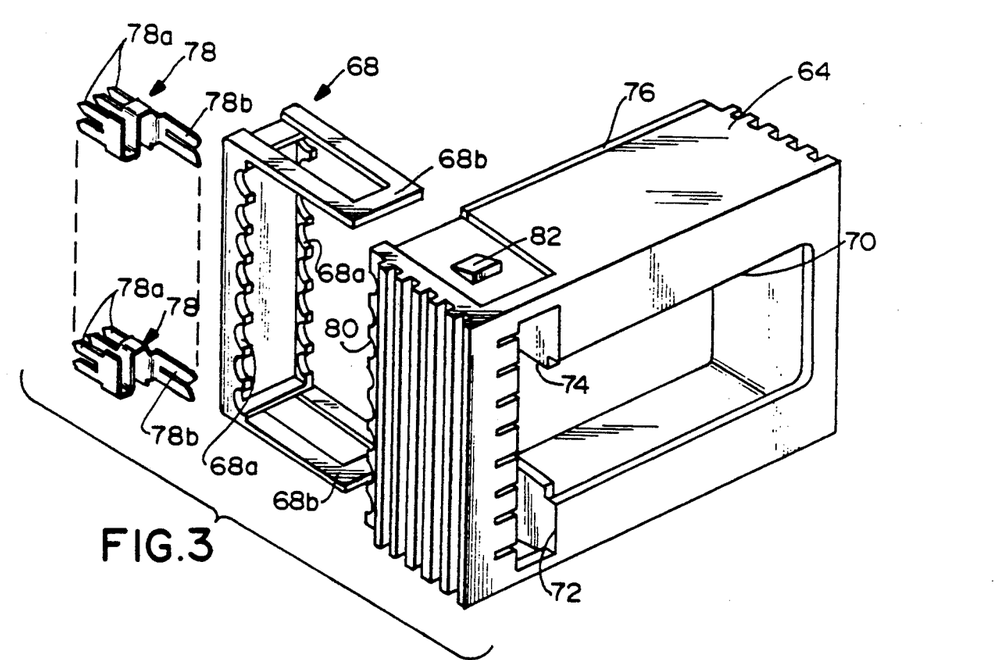
FIG. 3 is an exploded perspective view of the common housing means, the power line strain relief and two of the circuit contacts.

Referring to FIG. 3, each housing means 64 has a first opening 70 at the front thereof for receiving one of the receptacles 24, and a second opening 72 for receiving one of the interchangeable circuit control modules 72, the openings being in communication, as at 74. A back cover 76 may be provided for closing the back side of at least opening 70. A plurality of circuit contacts, generally designated 78, are mounted within housing 64, with insulation displacement bifurcated portions 78a projecting from the rear of the housing, and forwardly projecting bifurcated contact portions 78b being exposed within opening 72. In the circuit scheme illustrated in the drawings, there would be eight circuit contacts 78 mounted within housing 64, corresponding to eight distinct wires of power lines 58, as described hereinafter. Consequently, strain relief member 68 has eight pairs of notches 68a in two vertical rows thereof for alignment with eight notches 80 in two vertical rows thereof on the back side of housing 64. Notches 68a and 80 embrace and hold the discrete electrical wires in insulation displacement interengagement with contact portions 78a. The strain relief member snaps onto housing 64 by means of ramped detents 82 on the top and bottom of the housing which are engaged by U-shaped arms 68b of the strain relief member.

Referring back to FIG. 2, it should be noted that there are three interchangeable circuit control modules 26 shown at the right-hand side of the depiction, although only one of the modules can be inserted into opening 72 in housing 64. This depiction is illustrated to exemplify the interchangeability of the circuit control modules. Now, referring to FIG. 4, each circuit control module 26 includes a housing 84 having a grippable portion 86 at the front thereof, along with eight horizontal slots 88 in a vertical column of slots. The back side 84a and right-hand side 84b of housing 84 are open, for purposes described hereinafter. In accordance with the wiring and circuit contact scheme described in relation to FIG. 3, the eight slots 88 are provided for receiving portions of eight different control contacts in different arrays for interconnection with different ones of circuit contacts 78 corresponding to different power distribution circuits.

Figure 4:
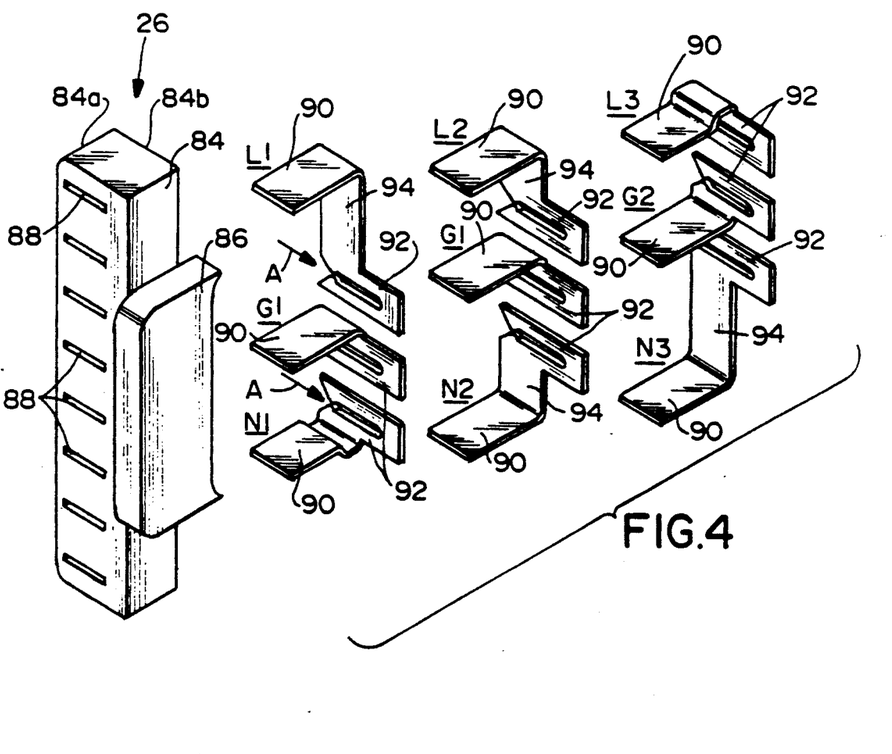
FIG. 4 is an exploded perspective view of the housing of one of the interchangeable circuit control modules, along with three different arrays of control contacts for mounting on the housing.

More particularly, although different wiring arrangements and interconnection schemes are contemplated, FIG. 4 shows somewhat schematically three different arrays of control contacts in three different columns. The left-hand column of contacts includes a power or line contact "L1", a ground contact "G1" and a neutral contact "N1". The center column of contacts includes a power or line contact "L2", a ground contact "G1" and a neutral contact "N2". The right-hand column of contacts includes a power or line contact "L3", a ground contact "G2" and a neutral contact "N3". Each contact includes a blade portion 90 and a slotted portion 92, with the blade portion and the slotted portion of some of the contacts being interconnected by a body portion 94. It can be seen that all of the blade portions are substantially identical and the slotted portions are of substantially identical configurations. The blade portions are designed for sliding between bifurcated contact portions 78b (FIG. 3) of selected ones of circuit contacts 78. The slotted portions 92 are designed for sliding into engagement with blade portions of receptacle contacts mounted on receptacles 24, as described hereinafter. It can be seen that the body portions 94 of some of the control contacts are of different lengths to position the respective blade portions in different ones of slots 88 in housing 84 of the interchangeable circuit control modules. In other words, all of the circuit control modules have identical configurations for positioning within common housing 64 (FIG. 3), except for the configuration of the control contacts and the different dispositions of the components thereof.

With the above description of FIG. 4, it can be assumed that power lines 58 (FIG. 2) include three power or line wires, two ground wires and three neutral wires. With the array and configuration of control contacts shown in the left-hand column of FIG. 4, power or line contact "L1" will be interconnected with a circuit contact 78 terminated to a first one of the power wires, ground contact "G1" will be interconnected with a circuit contact 78 terminated to a first ground wire and control contact "N1" will be interconnected with a circuit contact terminated to a first neutral wire. Referring to the center column of control contacts shown in FIG. 4, power or line contact "L2" will be interconnected with a circuit contact terminated to a second power wire, control contact "G1" will be interconnected with a circuit contact terminated, again, to the first ground wire, and control contact "N2" will be interconnected with a circuit contact terminated to a second neutral wire. Referring to the third or right-hand column or array of control contacts in FIG. 4, power or line contact "L3" will be interconnected with a circuit contact terminated to a third power wire, control contact "G2" will be interconnected with a circuit contact terminated to a second ground wire and control contact "N3" will be interconnected to a circuit contact terminated to a third neutral wire. The second ground wire, to which control contact "G2" is electrically coupled, may be an isolated ground for the system, as described above, to prevent interference with delicate electronic equipment at particular work areas.

Figure 5:
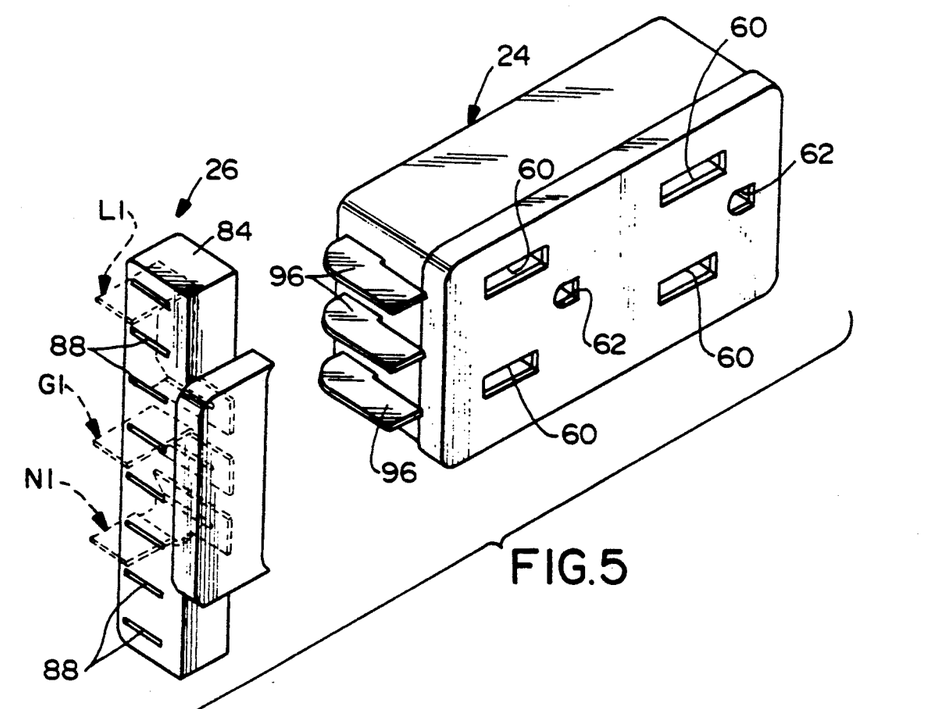
FIG. 5 is an exploded perspective view of the common plug-receiving receptacle and one of the interchangeable circuit control modules, with the power contacts on the module shown in phantom.

FIG. 5 shows one of the interchangeable circuit control modules 26, with control contacts "L1", "G1" and "N1" (i.e. the left-hand array of control contacts shown in FIG. 4) in phantom as if mounted within housing 84 of the circuit control module. FIG. 5 shows one of the common receptacles 24 having blade portions 96 of appropriate receptacle contacts projecting from the left-hand side of the receptacle. These contact blades are designed for sliding into slotted portions 92 of the control contacts, as indicated by arrows "A" (FIG. 4), when one of the control modules is inserted into opening 72 in housing 64 (FIG. 3) after the receptacle is inserted into opening 70 of the housing. The blade portions 96 of the receptacle contacts always are in the same disposition. Consequently, referring back to FIG. 4, it can be seen that the slotted portions 92 of all of the control contacts shown in FIG. 4 are in the same relative dispositions, regardless of the different configurations of the control contacts and the different locations of the blade portions 90 thereof, the plate portions 90 being located differently for interconnection with different ones of the eight circuit contacts 78. The receptacle contacts, although not shown, extend through receptacle 24 for engagement by standard prongs of standard plugs to be inserted into slots 60 and holes 62. Therefore, the center blade 96 would be part of a common ground contact running through receptacle 24 whereby ground Prongs of appropriate plugs, inserted into holes 62, will interconnect with the ground contact running through the receptacle and of which the center blade 96 is a part thereof.

Figure 6:
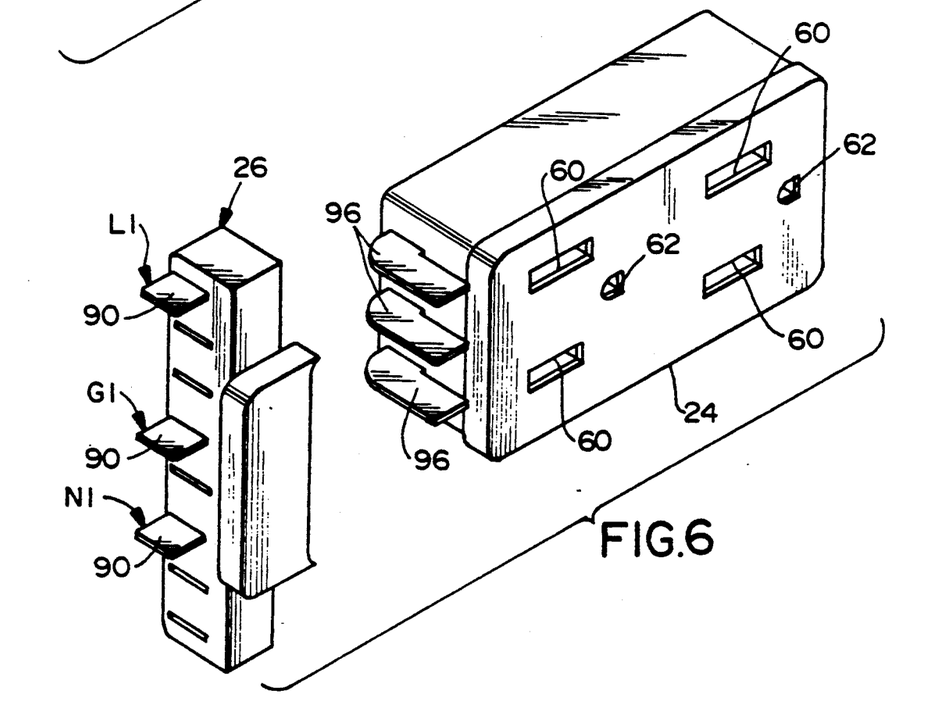
FIG. 6 is a view similar to that of FIG. 5, with the control contacts shown projecting from a side of the circuit control module.

Lastly, FIG. 6 is identical to FIG. 5, but the blade portions 90 of control contacts "L1", "G1" and "N1" are shown projecting from the left-hand side of circuit control module 26. In other words, the circuit control module now has been loaded with the left-hand array of control contacts as shown in FIG. 4.

In use, and referring to FIGS. 2, 3 and 6 with kick panel 31 removed, receptacles 24 are inserted into openings 70 in common housings 64 whereby blade portions 96 (FIG. 6) of each receptacle projects into opening 72 in the housing. With eight circuit contacts 78 terminated to three power or line wires, two ground wires and three neutral wires in a proper vertical array, and the terminated contacts and wires being held in position by strain relief member 68, the system now is ready for receiving any one of the different, interchangeable circuit control modules 26 which have been loaded with different arrays of control contacts as shown in and described in relation to the different arrays illustrated in FIG. 4. One of the interchangeable circuit control modules will electrically couple the respective receptacle contacts to one of the power or line wires, one of the ground wires and one of the neutral wires of power lines 58 (FIG. 2). Another circuit control module will electrically couple the receptacle contacts with a second power or line wire, the first ground wire and a second neutral wire. The third circuit control module will electrically couple the receptacle contacts to a third power or line wire, a second ground wire and a third neutral wire. Again, it should be emphasized that the eight-wire scheme of power lines 58, circuit contacts 78 and the particular number, array and disposition of the control contacts are but for illustration purposes and a wire variety of power line numbers and/or configurations are accommodatable by the present invention. In fact, rather than discrete wires comprising power lines 58, a flat ribbon cable also could be used within the concepts of the interchangeable circuit control module scheme of the invention.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. In a wire raceway to be mounted to a lower portion of a modular wall panel including:
    an elongated U-shaped member, within which pass electrical wires, having a longitudinal axis and two upstanding sidewalls with free edges,
    cover means attached to an open portion of said U-shaped member, and
    an electrical receptacle, having an outwardly facing surface, to be mounted to either of the side walls of said U-shaped member and adapted to be electrically connected to the wires,
    the improvement comprising:
    one slot on each of opposite sides of said receptacle located at a preset distance from the outwardly facing surface, and
    an opening in one of the sidewalls of the U-shaped channel having at least two sides parallel to each other and adapted to slidably mate with said slots,
    whereby said slots slide over the two sides of the openings to mount the receptacle to the U-shaped member.

2. In a wire raceway as set forth in claim 1, including the two sides in said opening being oriented so that they are perpendicular to the longitudinal axis of the raceway and pass through an unsupported edge of the sidewall of the U-shaped channel thereby forming an opening having three sides.

3. In a wire raceway as set forth in claim 2, including cover means adapted to mate with the unsupported edge of each side wall and to contact a portion of the receptacle to further hold the receptacle in the opening in the sidewall of the U-shaped channel.

4. In a wire raceway to be mounted to a lower portion of a modular wall panel including:
    an elongated U-shaped member, within which pass electrical wires, having a longitudinal axis and two upstanding sidewalls with free edges,
    cover means attached to an open portion of said U-shaped member, and
    an electrical receptacle, having an outwardly facing surface, to be mounted to either of the side walls of said U-shaped member and adapted to be electrically connected to said electrical wires,
    the improvement comprising:
    a multiple of slots on two opposite sides of said receptacle located varying distances from the outwardly facing surface, and
    an opening in one of the sidewalls of the U-shaped channel having at least two sides parallel to each other and adapted to mate with any pair of opposing slots on opposite sides of said receptacle,
    whereby the distance between the outwardly facing surface of the receptacle and an outer surface of the side walls of the U-shaped member will be determined depending upon which one slot on each opposite side of said receptacle is chosen to slide over the two sides of the openings.

5. In a wire raceway as set forth in claim 4, including the two sides in said opening being oriented so that they are perpendicular to the longitudinal axis of the raceway and pass through an unsupported extending edge of the sidewall of the U-shaped channel thereby forming an opening having three sides.

6. In a wire raceway as set forth in claim 5, including cover means adapted to contact the upper portion of the receptacle to further hold the receptacle in the opening in the sidewall of the U-shaped channel.

* * * * *